Dec. 3, 1963 G. H. PERRY ETAL 3,113,296

ELECTRONIC CIRCUITS

Filed Dec. 2, 1958 4 Sheets-Sheet 1

GERALD HORACE PERRY AND
ERIC WILLIAM SHALLOW
*Inventors*
By Cushman, Darby & Cushman
*Attorneys*

GERALD HORACE PERRY and
ERIC WILLIAM SHALLOW
*Inventors*
By Cushman, Darby & Cushman
*Attorneys*

GERALD HORACE PERRY and
ERIC WILLIAM SHALLOW
*Inventors*
By Cushman, Darby & Cushman
*Attorneys*

GERALD HORACE PERRY and
ERIC WILLIAM SHALLOW
Inventors
By Cushman, Darby & Cushman
Attorneys United States Patent Office 3,113,296
Patented Dec. 3, 1963

3,113,296

ELECTRONIC CIRCUITS

Gerald Horace Perry and Eric William Shallow, Malvern, England, assignors, by mesne assignments, to International Business Machines Corporation, New York, N.Y., a corporation of New York Filed Dec. 2, 1958, Ser. No. 777,744
Claims priority, application Great Britain Dec. 2, 1957
10 Claims. (Cl. 340—174)

This invention relates to electronic circuits and has reference to circuits which employ semiconductor devices of the transistor type.

A phenomenon which is associated with transistors and which is often found to produce unwanted effects in transistor circuits is that known as carrier storage. Carrier storage is caused by minority carriers which follow indirect paths in the semiconductor material and so are delayed in their arrival at the collector.

It has been established that, if a signal can be applied to the emitter-base circuit of a junction transistor so that minority carriers are stored in the base region of the transistor, the duration of a corresponding output signal obtained in the emitter-collector circuit is extended due to the stored carriers present in the base region. Further, if, during the existence of stored carriers, a further signal is applied to the emitter-base circuit of a polarity opposite to that used to establish carrier storage, the stored carriers are rapidly extracted. This provides a means of rapidly terminating an output signal dependent for its duration upon the stored carriers; in other words, a circuit can be provided in which the termination of an output signal can be controlled accurately by using controlled carrier storage.

According to the invention in one respect therefore, an electronic circuit comprises a transistor, a first input circuit for injecting minority carriers into the base of the transistor to establish a carrier storage condition therein, a second input circuit for extracting minority carriers from the base to terminate the carrier storage condition, and an output circuit associated with the collector-emitter circuit of the transistor for passing collector-emitter current when a carrier storage condition exists in the transistor whereby an output signal is initiated in the output circuit by operation of the first input circuit and up to a limit determined by the duration of the carrier storage condition is terminated by operation of the second input circuit.

An element for a shift register may be provided in a versatile and simple form by the incorporation in the circuit of the invention of a wound magnetic core of the rectangular hysteresis loop type to provide a permanent memory.

Additional windings may be provided on the magnetic cores of a cascaded series of such elements forming a shift register and interconnections made so that each element of the register can be read, or given a forward, or backward shift, as desired.

It has also been appreciated that a simple circuit of the two-state type can be constructed to take advantage of the phenomenon of carrier storage.

According to the invention in another aspect therefore an electronic circuit of the two-state type comprises a transistor, a first input circuit for injecting minority carriers into the base of the transistor to establish a carrier storage condition therein, a second input circuit for extracting minority carriers from the base to terminate the carrier storage condition, and a maintaining circuit for maintaining the carrier storage condition which is inoperative until the condition is set up by operation of the first input circuit, and operative thereafter until the condition is terminated by operation of the second input circuit.

By activating one or other of the input circuits the circuit is set into one or other of two states—the condition where carrier storage is maintained or the condition where it is not maintained.

Conveniently the maintaining circuit comprises a feedback circuit which is connected between the collector and the base of the transistor and is operative accordingly as the carrier storage condition has or has not been established.

In order to make the invention clearer, the minority carrier storage phenomenon will now be discussed briefly and its use in the provision of shift registers and a two-state circuit will be described. Reference will be made to the accompanying drawings, in which.

Figure 6:
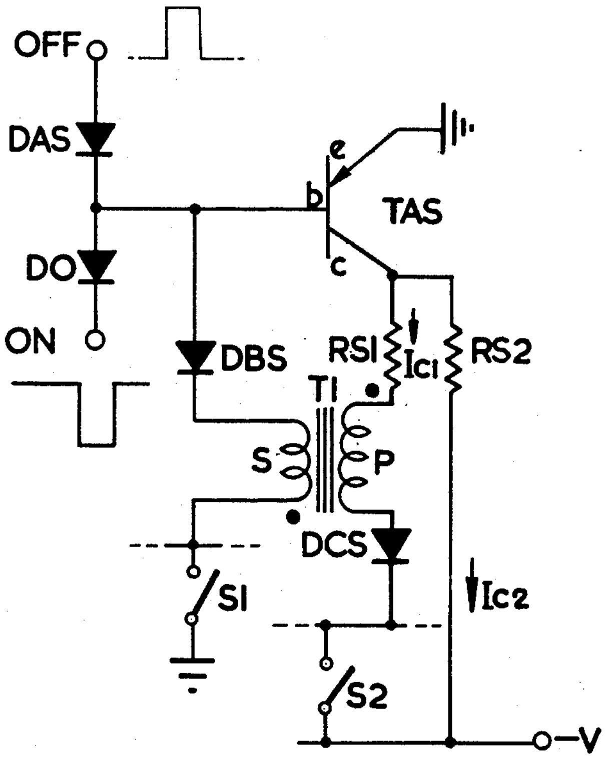
FIG. 6 shows schematically a circuit diagram of a two-state circuit.
Figure 7:
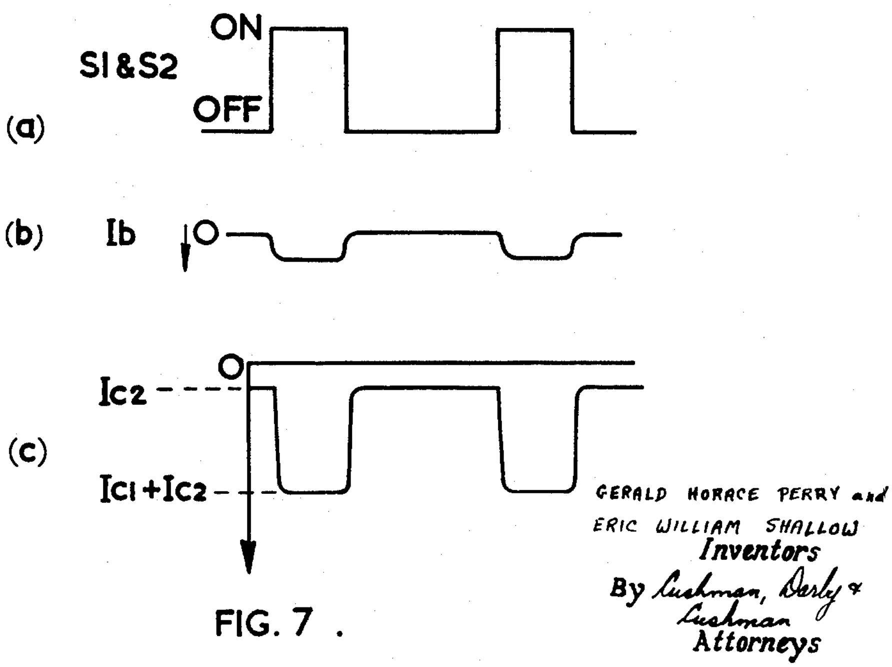

FIG. 7 (*a*, *b* and *c*) showns waveforms useful in understanding the operation of the circuit of FIG. 6.

Figure 1:
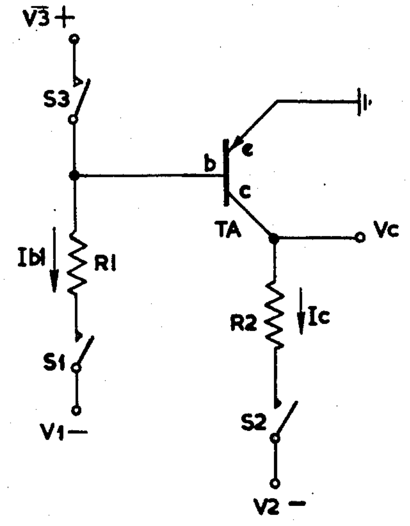
FIG. 1 shows a circuit in which minority carrier storage is used.

In the circuit of FIG. 1 a transistor TA having an earthed emitter is connected at its base via a resistor R1 and a switch S1 to a source of negative potential V1. If the switch S1 is closed, a current indicated as *Ib*1 flows in the emitter-base circuit of the transistor TA and through the resistor R1; consequently a number of minority carriers (if we are assuming in the present case a P-N-P transistor then these carriers can be named as holes) will be injected into the base region of the transistor TA. The number of stored holes depends, within certain limits, upon the amplitude and the duration of the current *Ib*1.

Now, the collector of the transistor TA is connected via a resistor R2 and a switch S2 to a further source of negative potential V2. Then, assuming the switch S1 in the emitter-base circuit has been opened leaving holes stored in the base region of the transistor TA, on the closing of the switch S2 a current I*c* will flow in the collector circuit of the transistor TA. If sufficient holes have been stored in the base region of the transistor TA the emitter-collector voltage reaches a minimum, a diffusion gradient is established and, because the base of the transistor TA is disconnected from a source of potential, current flows through the emitter to the collector and some further holes are injected into the base region of the transistor TA. In a junction transistor the current gain of the junction is less than unity, hence the number of holes stored in the base region of transistor TA decays and after a time the collector current commences to drop.

In this action the charge due to the current flowing to the source V2 is, in general, many times greater than the charge due to the original current flowing to the source $V_1$, which established the stored holes. Thus a short term memory is provided in which a signal in the emitter-base circuit produces a later, and possibly longer duration signal in the collector circuit of the transistor TA. This latter signal is available as a voltage output in the collector circuit at a terminal V*c*.

A source of positive potential V3 is connected via switch S3 to the base of the transistor TA. If during the flow of current I*c* in the collector circuit of the transistor TA the switch S3 is closed, any holes stored in the base region of the transistor TA are rapidly removed; the current I*c* thereupon drops rapidly. This provides a useful means of terminating the flow of the collector current $I_c$.

Figure 2:
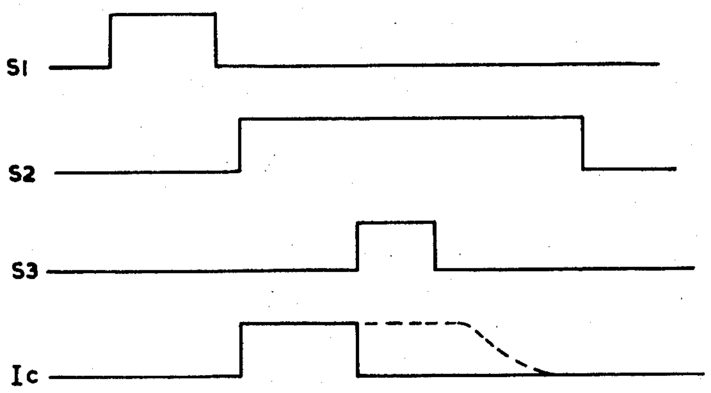
FIG. 2 shows waveform diagrams useful in understanding the operation of the circuit of FIG. 1.

The action of the circuit can be better visualised with the aid of the curves of FIG. 2 where S1 represents the closing for a short period of the switch S1; similarly the curve S2 represents the period for which the switch S2 is closed and during which period a collector current shown by the curve $I_c$ may flow. The curve S3 shows the period for which the switch S3 is operated and it will be seen that when the switch S3 is closed the current $I_c$ ceases. If the switch S3 is not closed the current $I_c$ continues, as indicated by the dotted line, eventually decaying slowly.

If the switch S2 is opened earlier, this of course will also terminate the flow of collector current $I_c$. In this instance however the switch S2 has to interrupt the flow of collector current $I_c$, which may have a value many times greater than that of the current which flows into the base of the transistor TA when S3 is closed. Since, in general, the voltage V2 is also many times greater than the voltage V3, the termination of the collector current $I_c$ by the closing of the switch S3, rather than the opening of the switch S2, involves the dissipation of considerably less power in the switch. This is an advantage when the collector current of a number of transistors has to be terminated simultaneously, as for example in the shift register which will be described later.

Figure 3:
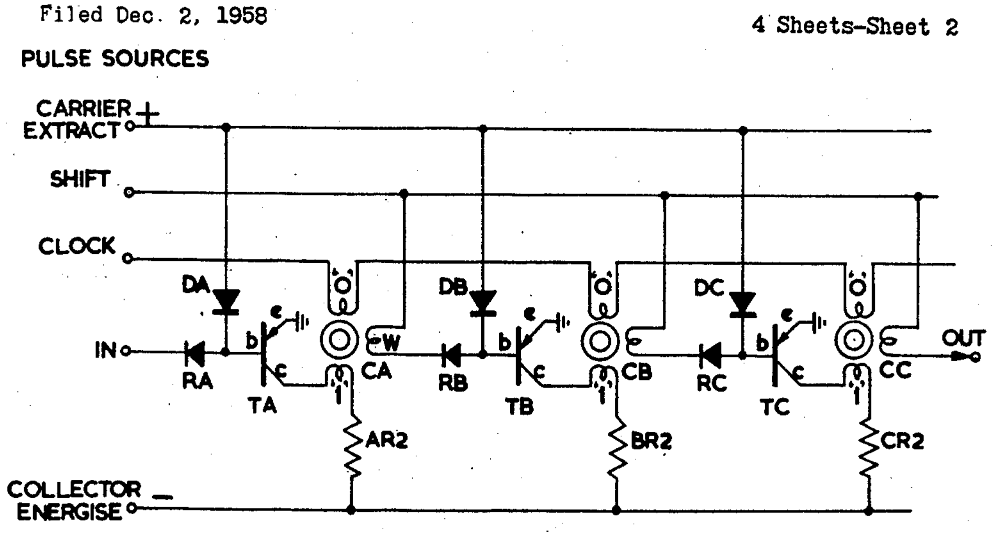
FIG. 3 shows in simplified diagrammatic form the arrangement of a multi-element shift register.

By the use of a wound magnetic core of the rectangular hysteresis loop type together with a transistor in a circuit making use of hole storage phenomena, an element suitable for use in a shift register can be provided simply; the magnetic core then provides a so-called permanent memory and the transistor a so-called temporary memory. A cascade of three such elements forming three stages of a shift register is shown in FIG. 3.

The first element of the shift register is made up of a ferrite, rectangular hysteresis loop core CA having 0 and 1 windings together with a third winding W and a transistor TA whose emitter is earthed and whose base in connected via a diode RA to an IN terminal of the register. The collector of the transistor TA is connected via the 1 winding of the core CA and a resistor AR2 to a common line connected to a source of pulses designated COLLECTOR ENERGISE. The 0 windings of the magnetic cores CA, CB . . . are connected in series to a source of pulses designated CLOCK. The third winding W of the magnetic core CA is connected between a common source of pulses designated SHIFT and a diode RB of the next element of the shift register which corresponds to the diode RA of the first element. An additional connection is made to the base of the transistor TA from a source of pulses designated CARRIER EXTRACT via a second diode DA. The subsequent stages of the shift register make use of transistors TB, TC . . . and magnetic cores CB, CC . . . and are similar to the first stage.

Figure 4:
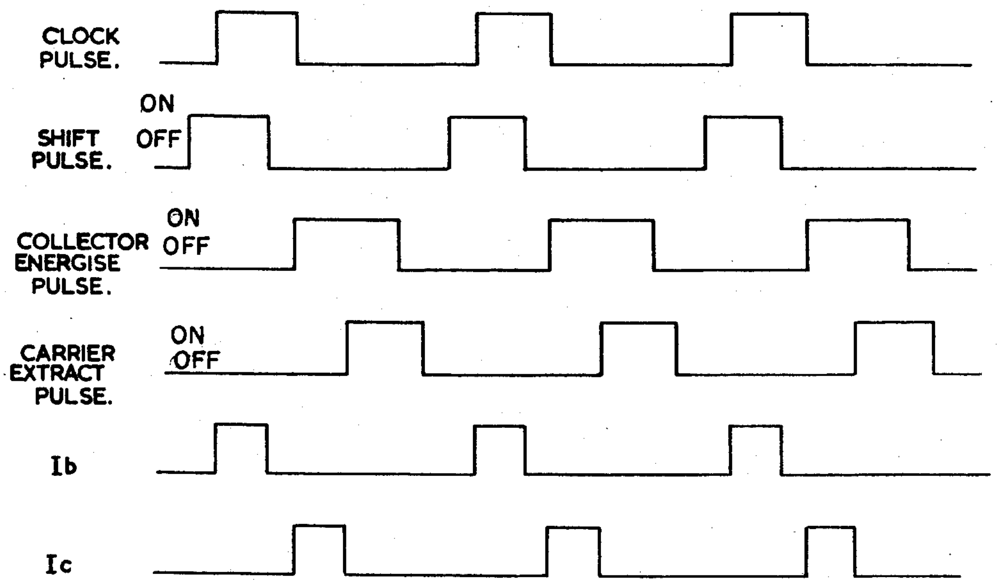
FIG. 4 shows waveform diagrams useful in understanding the operation of the arrangement of FIG. 3.

In operation it is assumed that pulses are available from the sources whose timing is as shown in the relevant curves of FIG. 4, and that the stages shown are preceded by a stage made up of an element similar to those described above.

If the core CA is in the 0 state then the advent of the first clock pulse will do nothing to change the state of the core CA, consequently no signals will be induced into the windings 1 and W; no signal will be passed to the next stage via the diode RB. If, however, the magnetic core of the preceding stage is in the 1 state the clock pulse will cause a signal to appear at the terminal IN of the register and be applied via the diode RA to energise the emitter-base circuit of the transistor TA. This circuit will be energised ($I_b$) in the period that the shift pulse is available to provide a datum voltage on the common line connected to the SHIFT source. The energisation ($I_b$) on the emitter-base circuit of the transistor TA continues as long as the shift pulse exists and is seen to finish at the end of the shift pulse. Carriers (holes for a PNP transistor) have, by then been stored in the base region of the transistor TA and, when a pulse appears from the COLLECTOR ENERGISE source, collector current $I_c$ is initiated and flows via the 1 winding of the core CA and the resistor AR2. The core CA is, of course, in its 0 state and consequently, when the collector current $I_c$ flows, is changed over to the 1 state; the winding W is energised but in the absence of a shift pulse no signal is applied to the base of the transistor TB of the second element. In any case the signal polarity would be such that the diode RB will isolate it from the base of the transistor TB. A pulse now arrives from the CARRIER EXTRACT source and applies a positive potential via the diode DA to the base of the transistor TA. Consequently stored carriers are extracted rapidly from the transistor TA and the collector current ceases abruptly.

It will now be noted that the core CA is now in the 1 state, consequently when the next clock pulse occurs, the core CA is changed over from the 1 to the 0 state and the winding W which has been connected to datum potential by a shift pulse—which has already started—is energised, and passes a signal via the diode RB of the next element of the register to the base of the transistor TB; this initiates carrier storage in that transistor.

The core CA and the transistor TA are now in their initial state but in the case of the second element stored carriers have been established in the base region of the transistor TB. Consequently when the next pulse occurs from the COLLECTOR ENERGISE source, the magnetic core CB is changed over from the 0 to the 1 state by the collector current of the transistor TB flowing in the 1 winding of the magnetic core CB. Subsequent operation of this second element of the register is the same as the operation just described for the first; the result being that a change of state is initiated in the magnetic core CC of the third element and the core CB of the second element returns to its initial state. The shift register action is now clear—a change of state shifts from one core to the next down the chain of cores of CA, CB, CC, . . . While, for simplicity, this description refers to a single 1 state being propagated through the shift register, the pattern of 1 states stored in the cores at any instant may be completely random. In fact if all cores are in the 1 state initially this pattern may be propagated through the shift register.

In order to appreciate the importance of the shift pulse arrangement used in the register, it is noted that by the time the CARRIER EXTRACT pulse comes ON the SHIFT PULSE has come OFF and so there is no parallel path, through the diode RB and the winding W to earth (emitter potential), by-passing the base-emitter circuit during the CARRIER EXTRACTION operation as there otherwise would be. Thus there is provided the advantage that the carrier extraction process is carried out more efficiently.

Another advantage which will be seen is that the SHIFT PULSE comes OFF before the end of the CLOCK PULSE thus permitting the final phase of switching of the preceding core to be achieved under "no-load" conditions. That is to say the coil W is effectively open-circuited when the SHIFT PULSE comes OFF and hence ceases to load the core which is carrying a changing flux. This means that the switching time of the core is closely defined and is less dependent upon the amount of flux in the core.

Figure 5:
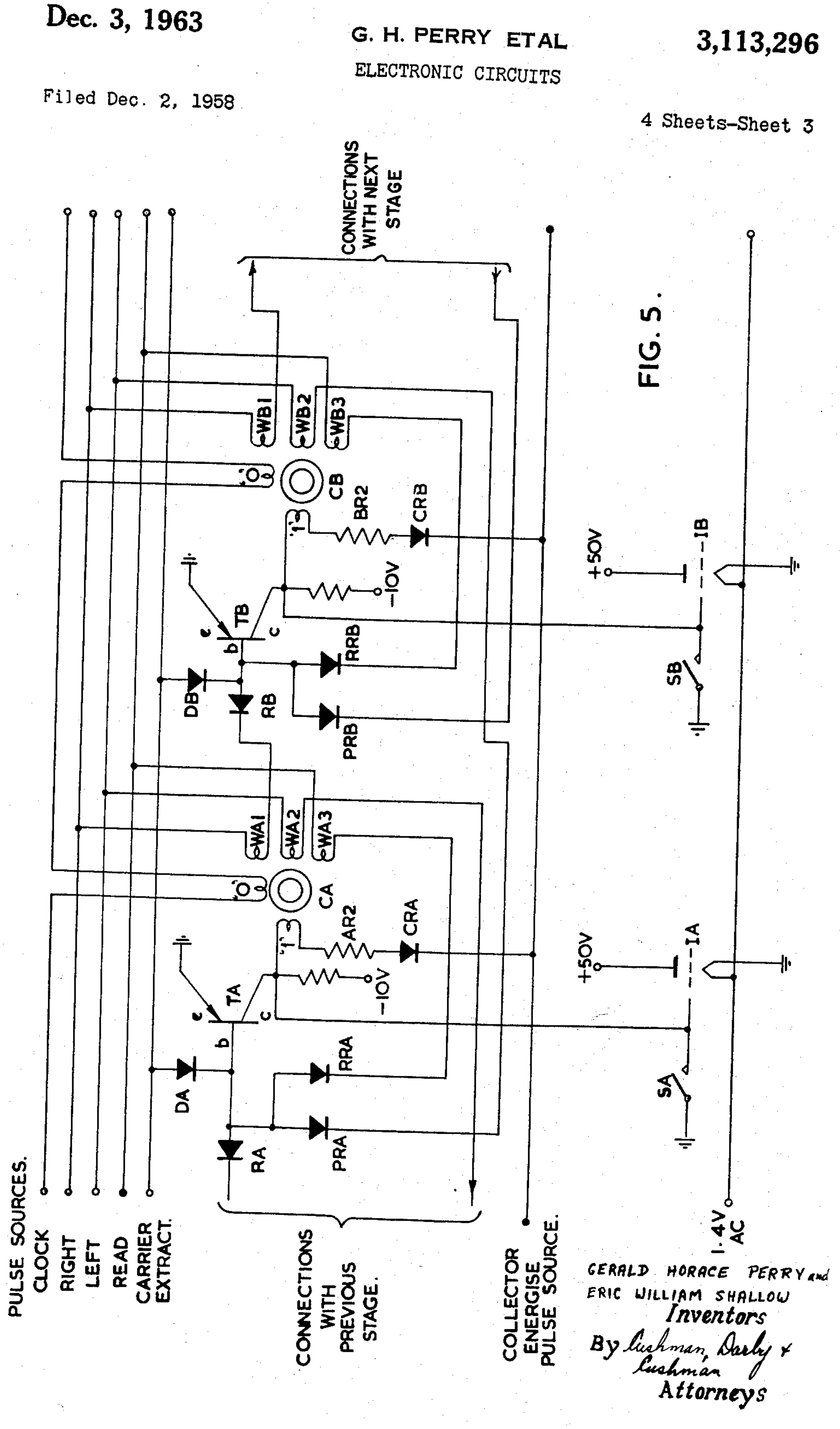
FIG. 5 shows schematically the circuit of a shift register which can be shifted in two directions.

A more refined shift register circuit is given in FIG. 5 in which the elements of the shift register of FIG. 3 will be recognised by their being similarly designated. In each element, for example the first, the magnetic core CA is provided with three additional windings WA1, WA2, WA3. The winding WA1 corresponds to the winding W of the register of FIG. 3 and is connected to a common line designated RIGHT. The winding WA2 is connected to a common line designated LEFT and feeds backwards to the previous stage. If the common line RIGHT is energised by a pulse source, whose pulses are timed similarly to the SHIFT pulse force of FIG. 3, the shift of the shift register is to the right and the action is similar to that already described with reference to the register of FIG. 3, but, if instead, the common line designated LEFT is energised by a source of pulses timed similarly to those by which the winding WA1 is energized, a signal will pass from the winding WA2, when the core CA is changed from the 1 to the 0 state, to the previous stage where it connects to a diode corresponding to the diode PRA of the present stage; this feeds to the base of the transistor of the previous stage, and the magnetic core of that stage is eventually changed to the 1 state by a sequence of operations closely similar to the action in an element which establishes a shift to the right. This is, of course, a shift to left.

A third winding WA3 is provided on the core CA and connected to a common line designated READ. If the common line READ is being energised by a pulse source instead of one of the lines LEFT or RIGHT, when the core CA changes from the 1 to the 0 state, a pulse is applied via the diode RRA to the base of the transistor TA; this initiates carrier storage in the base region of the transistor TA, so that the subsequent collector pulse restores the core CA to its initial condition. The effect is to read the content of the core CA and restore the core CA to its original condition without effecting a shift to the right or left.

Advantage may be taken of this READ facility to provide a visual indication of the state of the shift register without a left or right shift taking place. Cathode ray indicators IA, IB, . . . (Mullard type DM70) are connected at their grids to the collectors of the transistors TA, TB . . . respectively; this is shown in FIG. 5. From the previous description it will be appreciated that, when the shift register is operating in the READ condition, any stage that is storing a 1 produces at its transistor collector a series of output pulses at clock pulse frequency. By a choice of suitable voltage levels these pulses bias the grid of the appropriate cathode ray indicator IA, IB, . . . which fluoresces on the receipt of each pulse. Thus the indicator of any stage storing a 1 will be energised and the state of the shift register is immediately apparent.

In addition to accepting information in a serial fashion, i.e. from either the left or right, information may also be accepted in a parallel fashion, i.e. all stages may be set into the required state simultaneously. This is effected by the operation of switches SA, SB, etc. which are connected to the collectors of the transistors TA, TB, . . . respectively. The closing of any of these switches coincident with a COLLECTOR ENERGISE pulse will cause current to flow via the 1 winding of its associated core and hence set it into the 1 state.

Information may also be transferred, for example to another register, in a parallel fashion by the insertion of suitable windings in the other register (assuming the use of rectangular hysteresis loop cores in the other register) in series with the 1 winding in each stage of FIG. 5. Thus output signals from the stages of one register are transferred to the stages of the other register. Alternatively, the access points of one register are connected by unidirectional paths to different first input circuits of the second register whereby output signals at the stages of the one register are transferred to the corresponding stages of the other register. By the use of suitable gating circuits clock pulses may then be used to transfer the state of the shift register at the instant of the clock pulse without losing the information in the shift register itself.

Should it be necessary at any time to clear the shift register, i.e. to set all the cores CA, CB, . . . into the 0 state, this may be simply effected by suppressing one pulse from the appropriate one of the RIGHT, LEFT or READ pulse trains. The next pulse from the CLOCK pulse source then sets all cores storing a 1 into the 0 state as usual, but the signals produced at the appropriate W windings are unable to energise the emitter-base circuits of the transistors due to the absence of a RIGHT, LEFT or READ pulse. At the receipt of the COLLECTOR ENERGISE pulse therefore, no transistor collector currents flow and all cores remain in the 0 state.

In the shift register it can be ensured that in all the core-transistor elements, (*a*) energisation of the base circuit to establish hole storage is potentially longer than its duration as determined by the cessation of a shift pulse.

(*b*) the pulse of collector current Ic is potentially of longer duration than that determined by a pulse from the CARRIER EXTRACT source.

By this means the operation of the register circuit is made largely independent of individual component tolerances. Conveniently the CLOCK PULSE source may be a high impedance source of current pulses; this ensures that each core receives a constant switching current in its 0 winding regardless of the number of such cores in the shift register being switched from the 1 to the 0 state at that time. Thus, the operation of the circuit can be made largely independent of the number of 1 states being shifted.

It will be appreciated that the need for the RIGHT and LEFT SHIFT and READ pulse sources in the arrangement of FIG. 5 is in principle the same as for the SHIFT pulse source of FIG. 3 and already referred to with reference to that figure. In high-speed circuits close control in both design and operation are most desirable and the pulse arrangements of FIGS. 3 and 5 enable these desiderata to be achieved.

Typical pulse lengths and operation frequency depend mainly on the type of rectangular hysteresis loop core used. For cores of the Mullard type D2 (2 mm.) the following are typical operating conditions:

| | |
|---|---|
| Operating frequency | 100K p.p.s. |
| CLOCK PULSE | 3μ sec. long |
| Transistor base pulse to establish hole storage | 2μ sec. long |
| Transistor collector pulse (ouput from core-transistor element) | 2μ sec. long |

A two-state circuit will now be described which makes use of the phenomenon of minority carrier storage. Reference will be to FIGS. 6 and 7 of the drawings.

A transistor TAS (conveniently of the PNP type) is connected to earth at its emitter. An input terminal ON connects via a diode DO to the base of the transistor TAS and a further input terminal OFF is also connected to the base via a diode DAS.

A feedback circuit is provided by a feedback path between the collector of the transistor TAS and its base using a current transformer T1. The primary P of this transformer is connected, in series with a resistor RS1, a diode DCS and a switch S2, which operates at a predetermined pulse rate, between the collector of the transistor TAS and the negative potential source −V. The secondary S of the transformer T1 is connected between the base of the transistor TAS and earth, in series with a diode DBS and a second switch S1 which operates synchronously with the switch S2. A resistor RS2 is conveniently connected between the collector of the transistor TAS and a source of negative potential −V.

In operation the switches S1 and S2 operate continuously to establish pulse conditions in the base-collector feedback circuit of the transistor TAS. This establishes a reference switching waveform which is seen in the top graph *a* of FIG. 7.

If now a negative pulse is applied to the input terminal ON holes are injected into the base of the transistor TAS and when the switch S2 next closes a pulse of current flows in the collector circuit of the transistor TAS passing through the primary P of the transformer T1. Accordingly a current flows in the secondary S of the transformer T1 and, as the switch S1 will be closed at the same time as the switch S2 is closed, a pulse will be applied via the diode DBS to inject holes into the base of the transistor TAS. The injection of holes into the base of the transistor TAS due to the action of its base-collector feedback circuit means that holes are periodically being injected into the base of the transistor TAS in such a way as to maintain the collector current $Ic1+Ic2$—the waveform of this current is shown in the third graph *c* of FIG. 7—and this condition will continue as long as the switches S1 and S2 operate. The condition represents a stable state for the circuit and can conveniently be designated the 1 state. The base current $Ib$ condition for this 1 state in which periodic injection of holes occurs is shown in the second graph *b* of FIG. 7.

If a positive pulse, timed to occur when the switches S1 and S2 are not operated, is applied to the input terminal OFF any stored holes in the base of the transistor TAS are immediately extracted. This interrupts the stored hole condition; the collector circuit of the transistor TAS then returns to a quiescent state and no feedback to the base of the transistor TAS can occur. Only a negligible collector current $Ic2$ flows through the resistor RS2 in the emitter-collector circuit of the transistor TAS. The pulse on the input terminal OFF need be applied only for a sufficient time to extract the stored holes and interrupt the feedback. The circuit is now in its second stable state, which is conveniently termed the 0 state.

The circuit can be turned back into its 1 state by applying a negative pulse to the input terminal ON, the operation then being as described previously; and it can then be returned into the 0 state by applying a positive pulse to the input terminal OFF, and so forth.

In the 1 state of the two-state circuit (collector circuit quiescent) it is convenient for some purposes to be able to fix the value of the collector voltage; this is achieved by the inclusion in the circuit of the resistor RS2 previously referred to.

What we claim is:

1. A shift register comprising a plurality of elemental circuits connected in cascade,
each elemental circuit including
a transistor having a base, emitter, and collector,
a first pulse input circuit connected to the base of the transistor for injecting minority carriers in the form of a discrete pulse to establish a carrier storage condition therein,
a second pulse input circuit connected in the base-emitter circuit of the transistor for extracting minority carriers from the base to terminate the carrier storage condition,
an output circuit connected in the collector-emitter current when a carrier storage condition exists in the transistor,
a magnetic core of the rectangular hysteresis loop type carrying an energizing winding which couples it to the said output circuit so that collector-emitter current flowing in the output circuit energizes the core into a given magnetic state,
means for setting the core into the other of its two states,
means for producing a signal which is distinctive of the direction of change each time the state of magnetization of the core is changed,
and a unidirectional path which passes that distinctive signal which corresponds to a change of the core from the given state connecting the means for producing distinctive signals to the first input circuit of the succeeding elemental circuit,
a common input source connected via individual unidirectional elements to the said second input circuit of each said elemental circuit,
a common supply source connected to the output circuit of each elemental circuit for supplying the collector-emitter current,
a common clock source connected to the means for setting each core and,
a common shift signal source connected to the means for producing distinctive signals,
the common sources comprising pulse sources having a common pulse recurrence frequency in which pulses from the shift signal source precede and overlap pulses from the clock source
whereby the first input circuit of an elemental circuit is operated when a clock pulse changes the core state of the preceding elemental circuit the shift signal pulse already providing a datum for the means for producing the distinctive signal of the preceding elemental circuit,
pulses from the common supply source succeed clock pulses so that the core of the elemental circuit is energized by the energizing winding in the output circuit,
and pulses from the common input source commence after the beginning of pulses from the common supply source to determine the duration of energizations of the core by extracting minority carriers.

2. A shift register as in claim 1, wherein the shift signal source provides pulse signals which end before the clock pulses they overlap.

3. A shift register as in claim 1, for two-way operation wherein there is provided in each elemental circuit of the register after the first
a second means for producing a signal which is distinctive of the direction of change of flux each time the state of magnetization of the core is changed,
a second common shift signal source being connected thereto and,
a unidirectional path which passes that distinctive signal which corresponds to a change of the core from the given state connecting this second means to the first input circuit of the preceding elemental circuit,
the second common shift signal source comprising a pulse source having the same common recurrence frequency as the other common sources and
its pulses preceding and overlapping pulses from the clock source whereby the first input circuit of a given elemental circuit is operated when a clock pulse changes the state of the core of the succeeding elemental circuit and the second common shift signal source is already providing a datum for the second means for producing a distinctive signal of the succeeding elemental circuit,
pulses from the common supply source succeeding the clock pulses so that the core of the given elemental circuit is energized by the energizing winding in the output circuit, and
pulses from the common input source commencing after the beginnings of pulses from the common supply source to determine the duration of energizations of the core by extracting minority carriers.

4. A shift register as in claim 3, wherein the second shift signal source provides pulse signals which end before the clock pulses they overlap.

5. A shift register as in claim 1, having a read facility, wherein there is provided in each elemental circuit of the register
a further means for producing a signal which is distinctive of the direction of change of flux each time the state of magnetization of the core is changed, a read common signal source being connected thereto, and a unidirectional path which passes that distinctive signal which corresponds to a change of the core from the given state connecting this further means to the first input circuit of the elemental circuit, the read common signal source comprising a pulse source having the same common recurrence frequency as the other common sources and its pulses preceding and overlapping pulses from the clock source whereby the first input circuit of an elemental circuit is operated when a clock pulse changes the state of the core of the elemental circuit and the read signal source is already providing a datum for the said further means for producing a signal which is distinctive of the direction of change of flux each time the state of magnetization of the core is changed, pulses from the common supply source succeeding the clock pulses so that the core of the elemental circuit is energized by the energizing winding in the output circuit and, pulses from the common input source commencing after the beginnings of pulses from the common supply source to determine the duration of energizations of the core by extracting minority carriers.

6. A shift register as in claim 5 wherein the read signal source provides pulse signals which end before the clock pulses they overlap.

7. A shift register as in claim 3 having a read facility, wherein there is provided in each elemental circuit of the register a further means for producing a signal which is distinctive of the direction of change of flux each time the state of magnetization of the core is changed, a read common signal source being connected thereto, and a unidirectional path which passes that distinctive signal which corresponds to a change of the core from the given state connecting this further means to the first input circuit of the elemental circuit, the read common signal source comprising a pulse source having the same common recurrence frequency as the other common sources and its pulses preceding and overlapping pulses from the clock source whereby the first input circuit of an elemental circuit is operated when a clock pulse changes the state of the core of the elemental circuit and the read signal source is already providing a datum for the further means for producing a signal which is distinctive of the direction of change of flux each time the state of magnetization of the core is changed, pulses from the common supply source succeeding the clock pulses so that the core of the elemental circuit is energized by the energizing winding in the output circuit and, pulses from the common input source commencing after the beginnings of pulses from the common supply to determine the duration of energizations of the core by extracting minority carriers.

8. A shift register as in claim 7 wherein the read signal source provides pulse signals which end before the clock pulses they overlap.

9. A shift register as claimed in claim 7 defining access points each connected to the output circuits of a different elemental circuit, whereby a signal connected to an access point determines the state of the corresponding core when the common supply source energizes the corresponding output circuit.

10. A shift register as in claim 9 in combination with a second shift register, wherein the access points of one register are each connected via a unidirectional path to a different first input circuit of the other register in order, whereby information represented by core magnetic states of one register is transferred to the other register over the unidirectional paths.

References Cited in the file of this patent

UNITED STATES PATENTS

| | | |
|---|---|---|
| 2,747,110 | Jones | May 22, 1956 |
| 2,831,150 | Wright et al. | Apr. 15, 1958 |
| 2,843,762 | Trent | July 15, 1958 |
| 2,863,138 | Hemphill | Dec. 2, 1958 |
| 2,866,178 | Lo | Dec. 23, 1958 |
| 2,911,626 | Jones et al. | Nov. 3, 1959 |
| 2,921,206 | Kidd | Jan. 12, 1960 |
| 2,958,788 | Githens | Nov. 1, 1960 |
| 2,991,374 | De Miranda et al. | July 4, 1961 |
| 3,059,225 | Perry et al. | Oct. 16, 1962 |

OTHER REFERENCES

"Transistor Circuits," R. D. Lohman and R. R. Johnson, RCA Technical Notes, No. 128, Mar. 12, 1960.